(12) United States Patent
Qian et al.

(10) Patent No.: US 9,530,054 B2
(45) Date of Patent: Dec. 27, 2016

(54) SCENE RECOGNITION METHOD AND APPARATUS

(71) Applicant: Huawei Device Co., Ltd., Shenzhen (CN)

(72) Inventors: Kang Qian, Shanghai (CN); Cheng Du, Beijing (CN); Wei Luo, Shanghai (CN); Bin Deng, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 51 days.

(21) Appl. No.: 14/581,868

(22) Filed: Dec. 23, 2014

(65) Prior Publication Data

US 2015/0110356 A1    Apr. 23, 2015

Related U.S. Application Data

(63) Continuation of application No. PCT/CN2014/070994, filed on Jan. 21, 2014.

(30) Foreign Application Priority Data

Jan. 24, 2013    (CN) .......................... 2013 1 0027728

(51) Int. Cl.
*G06K 9/00* (2006.01)
*G06K 9/46* (2006.01)
(Continued)

(52) U.S. Cl.
CPC ......... *G06K 9/00624* (2013.01); *G06K 9/4604* (2013.01); *G06K 9/4642* (2013.01); *H04N 5/2351* (2013.01); *H04N 5/2355* (2013.01)

(58) Field of Classification Search
CPC .................................. G06K 9/00; H04N 5/00
(Continued)

(56) References Cited

U.S. PATENT DOCUMENTS 7,612,804 B1 * 11/2009 Marcu ...................... G06T 5/50
348/222.1
8,248,481 B2 * 8/2012 Savidge ................. H04N 5/235
348/208.4

(Continued)

FOREIGN PATENT DOCUMENTS

| CN | 101166240 A | 4/2008 |
|---|---|---|
| CN | 101909511 A | 12/2010 |

(Continued)

OTHER PUBLICATIONS

Supplementary European Search Report, Application No. 14743188.6, Sep. 7, 2015, 7 pages.

(Continued)

*Primary Examiner* — Abolfazl Tabatabai
(74) *Attorney, Agent, or Firm* — Slater Matsil, LLP (57) ABSTRACT

A scene recognition method includes acquiring an image and sensor data corresponding to the image and determining, in accordance with the sensor data, whether a scene of the image is a non-high-dynamic range (HDR) scene. The method also includes extracting an image feature of the image when it is not determined whether the scene of the image is the non-HDR scene and determining, in accordance with the image feature, whether the scene of the image is an HDR scene.

20 Claims, 2 Drawing Sheets

(51) Int. Cl.
*H04N 5/235* (2006.01)
*H04N 5/225* (2006.01)

(58) Field of Classification Search
USPC ........ 382/103, 107, 236; 348/169, 170, 171, 348/172, 352
See application file for complete search history.

(56) References Cited

U.S. PATENT DOCUMENTS

| | | | | |
|---|---|---|---|---|
| 8,339,468 | B2* | 12/2012 | Katagiri | H04N 19/40 348/222.1 |
| 8,717,457 | B2* | 5/2014 | Lin | H04N 5/232 348/222.1 |
| 2004/0218830 | A1 | 11/2004 | Kang et al. | |
| 2008/0187235 | A1 | 8/2008 | Wakazono et al. | |
| 2009/0027545 | A1 | 1/2009 | Yeo et al. | |
| 2010/0277650 | A1 | 11/2010 | Matsuzaki | |
| 2011/0222793 | A1 | 9/2011 | Ueda et al. | |
| 2012/0249844 | A1 | 10/2012 | Saito et al. | |

FOREIGN PATENT DOCUMENTS

| | | |
|---|---|---|
| CN | 102111560 A | 6/2011 |
| EP | 0725536 A2 | 8/1996 |
| EP | 1971137 A2 | 9/2008 |
| JP | 2011188277 A | 9/2011 |
| JP | 2011244053 A | 12/2011 |
| JP | 2012109849 A | 6/2012 |
| JP | 2012205244 A | 10/2012 |

OTHER PUBLICATIONS

Vallikumari, V., et al., "HDR Scene Detection and Capturing Strategy," 2011 Annual IEEE India Conference (INDICON), Dec. 16-18, 2011, 4 pages.

Vuong, Q.K., et al., "A New Auto Exposure System to Detect High Dynamic Range Conditions Using CMOS Technology," Third 2008 International Conference on Convergence and Hybrid Information Technology, Nov. 11-13, 2008, pp. 577-580.

* cited by examiner

SCENE RECOGNITION METHOD AND APPARATUS

CROSS-REFERENCE TO RELATED APPLICATIONS

This application is a continuation of International Application No. PCT/CN2014/070994, filed on Jan. 21, 2014, which claims priority to Chinese Patent Application No. 201310027728.9, filed on Jan. 24, 2013, both of which are hereby incorporated by reference in their entireties.

TECHNICAL FIELD

The present invention relates to the field of image technologies, and in particular, to a scene recognition method and apparatus.

BACKGROUND

A high-dynamic range (HDR) scene is a scene whose scene dynamic range is greater than a dynamic range of a picture. In an HDR scene, an HDR synthesis algorithm needs to be adopted to synthesize an image so as to obtain a high-quality picture. Therefore, accurately determining whether a scene of an image is an HDR scene is of vital importance to formation of a high-quality picture in an HDR scene.

SUMMARY

In view of this, the present invention provides a scene recognition method and apparatus, which can improve accuracy of recognizing whether a scene of an image is a high-dynamic range (HDR) scene.

According to a first aspect, the present invention provides a scene recognition method, and the method includes: acquiring an image and sensor data corresponding to the image; performing, according to the sensor data, non-high-dynamic range HDR scene determining on a scene of the image; extracting an image feature of the image when it is not determined whether the scene of the image is a non-HDR scene; and determining, according to the image feature, whether the scene of the image is an HDR scene.

In a first possible implementation manner of the first aspect, the extracting an image feature of the image is specifically: extracting, according to image histogram distribution of the image, a dark area pixel ratio, a bright area pixel ratio, intensity of dark area histogram variation, and intensity of bright area histogram variation of the image.

With reference to the first possible implementation manner of the first aspect, in a second possible implementation manner, the step of determining, according to the image feature, whether the scene of the image is an HDR scene includes: determining, according to the image feature, whether the image is underexposed and whether the image is overexposed; and determining that the scene of the image is an HDR scene when the image is underexposed and the bright area pixel ratio of the image is not less than a preset minimum value of a bright area pixel ratio in an HDR scene, and/or when the image is overexposed and the dark area pixel ratio of the image is not less than a preset minimum value of a dark area pixel ratio in an HDR scene.

With reference to the second possible implementation manner of the first aspect, in a third possible implementation manner, the determining, according to the image feature, whether the image is underexposed and whether the image is overexposed is specifically: determining that the image is underexposed when the dark area pixel ratio is not less than a preset threshold of a dark area pixel ratio; determining that the image is underexposed when the intensity of dark area histogram variation is not less than a preset threshold of intensity of dark area histogram variation and the dark area pixel ratio is not less than a preset minimum value of a dark area pixel ratio when the intensity of dark area histogram variation reaches the threshold; determining that the image is overexposed when the bright area pixel ratio is not less than a preset threshold of a bright area pixel ratio; and determining that the image is overexposed when the intensity of bright area histogram variation is not less than a preset threshold of intensity of bright area histogram variation and the bright area pixel ratio is not less than a preset minimum value of a bright area pixel ratio when the intensity of bright area histogram variation reaches the threshold.

With reference to the second possible implementation manner of the first aspect or with reference to the third possible implementation manner of the first aspect, in a fourth possible implementation manner, the step of determining, according to the image feature, whether the scene of the image is an HDR scene further includes: determining that the scene of the image is a first HDR scene when the image is underexposed, the bright area pixel ratio of the image is not less than the preset minimum value of a bright area pixel ratio in an HDR scene, and the image is not overexposed; determining that the scene of the image is a second HDR scene when the image is overexposed, the dark area pixel ratio of the image is not less than the preset minimum value of a dark area pixel ratio in an HDR scene, and the image is not underexposed; and determining that the scene of the image is a third HDR scene when the image is underexposed and the bright area pixel ratio of the image is not less than the preset minimum value of a bright area pixel ratio in an HDR scene, and when the image is overexposed and the dark area pixel ratio of the image is not less than the preset minimum value of a dark area pixel ratio in an HDR scene.

With reference to the first aspect or with reference to the first possible implementation manner of the first aspect or with reference to the second possible implementation manner of the first aspect or with reference to the third possible implementation manner of the first aspect or with reference to the fourth possible implementation manner of the first aspect, in a fifth possible implementation manner, before the extracting an image feature of the image, the method further includes: performing downsampling processing on the image.

According to a second aspect, the present invention provides a scene recognition apparatus, and the apparatus includes: an acquiring unit, configured to acquire an image and sensor data corresponding to the image; a first determining unit, configured to perform, according to the sensor data, non-high-dynamic range HDR scene determining on a scene of the image; an extracting unit, configured to extract an image feature of the image when it is not determined whether the scene of the image is a non-HDR scene; and a second determining unit, configured to determine, according to the image feature, whether the scene of the image is an HDR scene.

In a first possible implementation manner of the second aspect, the extracting unit is specifically configured to: extract, according to image histogram distribution of the image, a dark area pixel ratio, a bright area pixel ratio, intensity of dark area histogram variation, and intensity of bright area histogram variation of the image.

With reference to the first possible implementation manner of the second aspect, in a second possible implementation manner, the second determining unit includes: a judging module and a determining module, where the judging module is configured to determine, according to the image feature, whether the image is underexposed and whether the image is overexposed, and the determining module is configured to determine that the scene of the image is an HDR scene when the image is underexposed and the bright area pixel ratio of the image is not less than a preset minimum value of a bright area pixel ratio in an HDR scene, and/or when the image is overexposed and the dark area pixel ratio of the image is not less than a preset minimum value of a dark area pixel ratio in an HDR scene.

With reference to the second possible implementation manner of the second aspect, in a third possible implementation manner, the judging module is specifically configured to: determine that the image is underexposed when the dark area pixel ratio is not less than a preset threshold of a dark area pixel ratio; determine that the image is underexposed when the intensity of dark area histogram variation is not less than a preset threshold of intensity of dark area histogram variation and the dark area pixel ratio is not less than a preset minimum value of a dark area pixel ratio when the intensity of dark area histogram variation reaches the threshold; determine that the image is overexposed when the bright area pixel ratio is not less than a preset threshold of a bright area pixel ratio; and determine that the image is overexposed when the intensity of bright area histogram variation is not less than a preset threshold of intensity of bright area histogram variation and the bright area pixel ratio is not less than a preset minimum value of a bright area pixel ratio when the intensity of bright area histogram variation reaches the threshold.

With reference to the second possible implementation manner of the second aspect or with reference to the third possible implementation manner of the second aspect, in a fourth possible implementation manner, the determining module is further configured to: determine that the scene of the image is a first HDR scene when the image is underexposed, the bright area pixel ratio of the image is not less than the preset minimum value of a bright area pixel ratio in an HDR scene, and the image is not overexposed; determine that the scene of the image is a second HDR scene when the image is overexposed, the dark area pixel ratio of the image is not less than the preset minimum value of a dark area pixel ratio in an HDR scene, and the image is not underexposed; and determine that the scene of the image is a third HDR scene when the image is underexposed and the bright area pixel ratio of the image is not less than the preset minimum value of a bright area pixel ratio in an HDR scene, and when the image is overexposed and the dark area pixel ratio of the image is not less than the preset minimum value of a dark area pixel ratio in an HDR scene.

With reference to the second aspect or with reference to the first possible implementation manner of the second aspect or with reference to the second possible implementation manner of the second aspect or with reference to the third possible implementation manner of the second aspect or with reference to the fourth possible implementation manner of the second aspect, in a fifth possible implementation manner, the apparatus further includes: an image processing unit, configured to perform downsampling processing on the image before the extracting unit extracts the image feature of the image.

According to a third aspect, the present invention provides a terminal, and the terminal includes the apparatus according to any implementation manner of the second aspect.

In the foregoing solution, sensor data is used to determine whether a scene of an image is a non-HDR scene, which can effectively increase a speed of scene determining; when the determining cannot be performed according to the sensor data, an image feature is used to determine the scene of the image, which can effectively improve accuracy of determining whether the scene of the image is an HDR scene.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
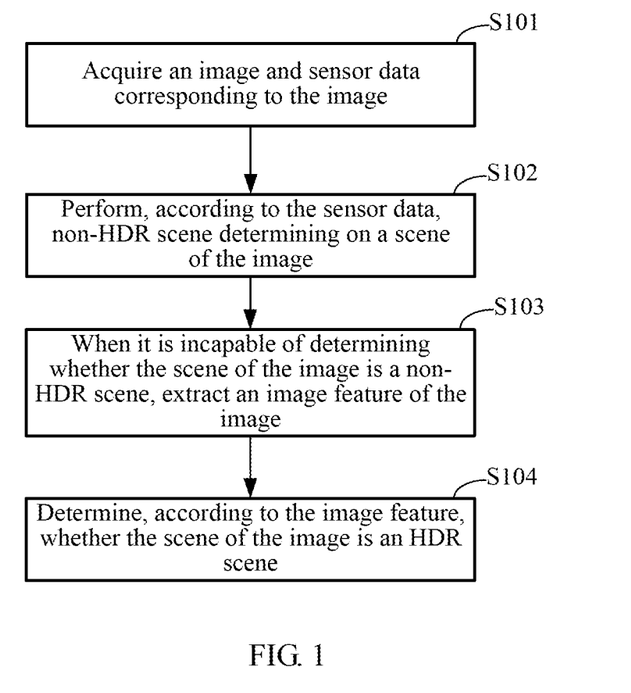
FIG. 1 is a flowchart of a scene recognition method according to an embodiment of the present invention.

The following uses FIG. 1 as an example to describe in detail a scene recognition method provided in an embodiment of the present invention, where FIG. 1 is a flowchart of a scene recognition method according to this embodiment of the present invention. The scene recognition method is executed by a terminal that has a photographing function. As shown in FIG. 1, the scene recognition method includes the following steps:

Step S101: Acquire an image and sensor data corresponding to the image.

The image is a preview image acquired during photographing by the terminal, and the sensor data is sensor data acquired by using a sensor when the preview image is acquired, for example, data such as exposure time, average luminance, and light sensitivity International Standards Organization (ISO) that are acquired by using a sensor.

Step S102: Perform, according to the sensor data, non-HDR scene determining on a scene of the image.

The terminal preliminarily determines, according to the acquired sensor data, whether the scene of the image acquired at this time is a non-HDR scene. When the acquired sensor data complies with a standard of a non-HDR scene, it may be determined that the scene of the image is a non-HDR scene. For example, if the acquired exposure time is too long, the acquired ISO value is too large, or the acquired average luminance is too low, it indicates that a current scene of the image is a night scene or a low-illuminated scene, and then it may be confirmed that the scene of the image is a non-HDR scene.

It should be noted that, according to the sensor data, it can only be determined that the scene of the image is not an HDR scene, and the system may be not determined whether the scene of the image is a non-HDR scene. Therefore, when the system is not determined, according to the sensor data, whether the scene of the image is a non-HDR scene, further determining needs to be performed by means of another step.

Step S103: When the system is incapable of determining whether the scene of the image is a non-HDR scene, extract an image feature of the image.

Specifically, each image corresponds to an image histogram, and a dark area pixel ratio (low_sum_ratio), a bright area pixel ratio (high_sum_ratio), intensity of dark area histogram variation (low_diff_hist), and intensity of bright area histogram variation (high_diff_hist) that are of the image are extracted according to image histogram distribution corresponding to the image, so that the terminal further determines, according to these extracted image features, whether the scene of the image is an HDR scene.

Step S104: Determine, according to the image feature, whether the scene of the image is an HDR scene.

It should be first noted that, thresholds used for determining whether an image is an HDR scene are preset in the terminal, and these thresholds include: a threshold of a dark area pixel ratio (sumThreshold_low), a threshold of a bright area pixel ratio (sumThreshold_high), a threshold of intensity of dark area histogram variation (DIFFThreshold_low), a threshold of intensity of bright area histogram variation (DIFFThreshold_high), a minimum value of a dark area pixel ratio (HDR_SUM_THRESHOLD_LOW_MIN_FOR_DIFF) when low_diff_hist reaches DIFFThreshold_low, a minimum value of a bright area pixel ratio (HDR_SUM_THRESHOLD_HIGH_MIN_FOR_DIFF) when high_diff_hist reaches DIFFThreshold_high, a minimum value of a dark area pixel ratio (HDR_SUM_THRESHOLD_LOW_MIN) in an HDR scene, and a minimum value of a bright area pixel ratio (HDR_SUM_THRESHOLD_HIGH_MIN) in an HDR scene. Each threshold may be set to a different value according to different configurations of different terminals, and a value of a threshold is not specifically limited in the present invention.

Based on the foregoing preset thresholds, the terminal performs determining according to the extracted image feature. The terminal first determines whether the image is underexposed, and meanwhile determines whether the image is overexposed.

When the extracted image feature meets at least one of the following conditions, it may be determined that the image is underexposed:

low_sum_ratio is not less than sumThreshold_low; and
low_diff_hist is not less than DIFFThreshold_low and low_sum_ratio is not less than HDR_SUM_THRESHOLD_LOW_MIN_FOR_DIFF.

The image is underexposed because, when one of the foregoing conditions is met, luminance histogram distribution of the image is concentrated in a dark area or is relatively intense in a dark area.

When the extracted image feature meets at least one of the following conditions, it may be determined that the image is overexposed:

high_sum_ratio is not less than sumThreshold_high; and
high_diff_hist is not less than DIFFThreshold_high and high_sum_ratio is not less than HDR_SUM_THRESHOLD_HIGH_MIN_FOR_DIFF.

The image is overexposed because, when one of the foregoing conditions is met, the luminance histogram distribution of the image is concentrated in a bright area or is relatively intense in a bright area.

After it is confirmed whether the image is underexposed and overexposed, determining is further performed.

When the extracted image feature meets at least one of the following conditions, it may be determined that the scene of the image is an HDR scene:

The image is underexposed and high_sum_ratio is not less than HDR_SUM_THRESHOLD_HIGH_MIN (hereinafter referred to as Condition 1).

The image is overexposed and low_sum_ratio is not less than HDR_SUM_THRESHOLD_LOW_MIN (hereinafter referred to as Condition 2).

When one of the foregoing conditions is met, it indicates that a dynamic range of the current image cannot sufficiently present a dynamic range of a real scene; therefore, the scene of the image is an HDR scene.

There is still a difference in an HDR scene between a case in which the image feature meets Condition 1, a case in which the image feature meets Condition 2, and a case in which the image feature meets both Condition 1 and Condition 2. In order to provide more precise data for image synthesis, an HDR scene needs to be further categorized. As shown in Table 1, Table 1 is a logical relationship table for determining an HDR scene category.

TABLE 1

| Scene category, number of exposed frames, and exposure strength | | Condition met |
|---|---|---|
| HDR scene | First HDR scene | Two frames are synthesized, one frame is normally exposed, and the other frame is long exposed | Condition 1 is met and the image is not overexposed |
| | Second HDR scene | Two frames are synthesized, one frame is normally exposed, and the other frame is short exposed | Condition 2 is met and the image is not underexposed |
| | Third HDR scene | Three frames are synthesized, one frame is normally exposed, one is short exposed, and one is long exposed | Both Condition 1 and Condition 2 are met |
| | Non-HDR scene | | Neither Condition 1 nor Condition 2 is met |

It may be learned from Table 1 that, when the image feature of the image meets Condition 1 and the image is not overexposed, it is determined that the scene of the image is a first HDR scene. When the image feature of the image meets Condition 2 and the image is not underexposed, it is determined that the scene of the image is a second HDR scene. When the image feature of the image meets both Condition 1 and Condition 2 at the same time, it is determined that the scene of the image is a third HDR scene. When the image feature of the image meets neither Condition 1 nor Condition 2, it is determined that the scene of the image is a non-HDR scene.

After it is determined that the scene of the image is an HDR scene, a type of the HDR scene is further determined, which can provide more precise data, for example, the number of image frames required for exposure and exposure strength, for HDR synthesis performed on an image in the HDR scene, thereby effectively improving quality of the image photographed in the HDR scene.

Specifically, it may further be learned from Table 1 that, after it is determined that the scene of the image is the first HDR scene, two frames of images are synthesized according to the determined first HDR scene when HDR synthesis is performed during photographing, where one frame is normally exposed, and the other frame is long exposed to synthesize the two frames into a picture. After it is determined that the scene of the image is the second HDR scene, two frames of images are synthesized according to the determined second HDR scene when HDR synthesis is performed during photographing, where one frame is normally exposed, and the other frame is short exposed to synthesize the two frames into a picture. After it is determined that the scene of the image is the third HDR scene, three frames of images are synthesized according to the determined third HDR scene when HDR synthesis is performed during photographing, where one frame is normally exposed, one frame is short exposed, and one frame is long exposed to synthesize the three frames into a picture. In addition, when it is determined that the scene of the image is a non-HDR scene, HDR synthesis does not need to be performed during photographing and corresponding processing is performed according to another scene. By further determining different types of HDR scenes, a corresponding number of frames and corresponding exposure strength may be provided for subsequent HDR synthesis according to the different types of HDR scenes, thereby improving quality of a picture photographed in each type of HDR scene.

Preferably, in order to reduce time consumed for extracting the image feature, downsampling processing may be performed on the image before the image feature of the image is extracted. For example, actual pixels of the image are 1920×1080 pixels, and before the image feature is extracted, the pixels of the image are reduced to 640×360 pixels. In this way, when the image feature is extracted, time consumption can be reduced, thereby speeding up scene recognition.

By using a scene recognition method provided in an embodiment of the present invention, it is first determined, according to sensor data corresponding to an image, whether the image is a non-HDR scene, which can effectively increase a speed of scene determining; when the determining cannot be performed according to the sensor data, an image feature is then used to determine a scene of the image, which can effectively improve accuracy of determining whether the scene of the image is an HDR scene, thereby improving quality of a picture photographed in the HDR scene.

Figure 2:
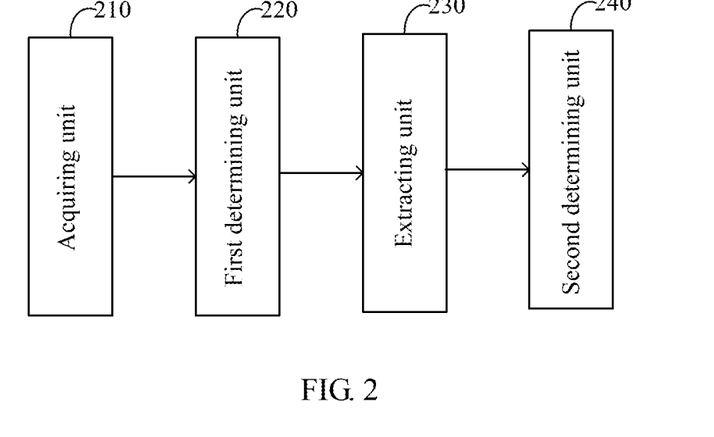
FIG. 2 is a schematic structural diagram of a scene recognition apparatus according to another embodiment of the present invention.

The following uses FIG. 2 as an example to describe in detail a scene recognition apparatus provided in another embodiment of the present invention, and FIG. 2 is a schematic structural diagram of a scene recognition apparatus according this embodiment of the present invention. The scene recognition apparatus is disposed in a terminal that has a photographing function, and is used to implement a scene recognition method provided in an embodiment of the present invention. As shown in FIG. 2, the scene recognition apparatus includes: an acquiring unit 210, a first determining unit 220, an extracting unit 230, and a second determining unit 240.

The acquiring unit 210 is configured to acquire an image and sensor data corresponding to the image.

The image is a preview image acquired during photographing by the terminal, and the sensor data is sensor data acquired by using a sensor when the preview image is acquired, for example, data such as exposure time, average luminance, and ISO.

The first determining unit 220 is configured to perform, according to the sensor data, non-HDR scene determining on a scene of the image.

The first determining unit 220 preliminarily determines, according to the acquired sensor data, whether the scene of the image acquired at this time is a non-HDR scene. When the acquired sensor data complies with a standard of a non-HDR scene, it may be determined that the scene of the image is a non-HDR scene. For example, if acquired exposure time is too long, an acquired ISO value is too large, or acquired average luminance is too low, it indicates that a current scene of the image is a night scene or a low-illuminated scene, and then it may be confirmed that the scene of the image is a non-HDR scene.

It should be noted that, according to the sensor data, the first determining unit 220 can only determine that the scene of the image is not an HDR scene, and it may be that the first determining unit 220 is not determined whether the scene of the image is a non-HDR scene; therefore, when the first determining unit 220 is incapable of determining, according to the sensor data, whether the scene of the image is a non-HDR scene, further determining needs to be performed by using another unit.

The extracting unit 230 is configured to extract an image feature of the image if the first determining unit 220 is incapable of determining, according to the sensor data, whether the scene of the image is a non-HDR scene.

Specifically, each image corresponds to an image histogram, and the extracting unit 230 extracts, according to image histogram distribution corresponding to the image, a dark area pixel ratio (low_sum_ratio), a bright area pixel ratio (high_sum_ratio), intensity of dark area histogram variation (low_diff_hist) and intensity of bright area histogram variation (high_diff_hist) that are of the image, so that the second determining unit 240 further determines, according to these extracted image features, whether the scene of the image is an HDR scene.

The second determining unit 240 is configured to determine, according to the image feature, whether the scene of the image is an HDR scene.

It should be first noted that, thresholds used for determining whether an image is an HDR scene are preset in the second determining unit 240, and these thresholds include: a threshold of a dark area pixel ratio (sumThreshold_low), a threshold of a bright area pixel ratio (sumThreshold_high), a threshold of intensity of dark area histogram variation (DIFFThreshold_low), a threshold of intensity of bright area histogram variation (DIFFThreshold_high), a minimum value of a dark area pixel ratio (HDR_SUM_THRESHOLD_ LOW_MIN_FOR_DIFF) when low_diff_hist reaches DIFFThreshold_low, a minimum value of a bright area pixel ratio (HDR_SUM_THRESHOLD_HIGH_MIN_FOR_DIFF) when high_diff_hist reaches DIFFThreshold_high, a minimum value of a dark area pixel ratio (HDR_SUM_THRESHOLD_LOW_MIN) in an HDR scene, and a minimum value of a bright area pixel ratio (HDR_SUM_THRESHOLD_HIGH_MIN) in an HDR scene. Each threshold may be set to a different value according to different configurations of different terminals, and a value of a threshold is not specifically limited in the present invention.

Based on the foregoing preset thresholds, the second determining unit 240 performs determining according to the extracted image feature.

Further, the second determining unit 240 includes: a judging module 241 and a determining module 242.

Firstly, the judging module 241 determines whether the image is underexposed and meanwhile determines whether the image is overexposed.

When the extracted image feature meets at least one of the following conditions, it may be determined that the image is underexposed:

low_sum_ratio is not less than sumThreshold_low; and
low_diff_hist is not less than DIFFThreshold_low and low_sum_ratio is not less than HDR_SUM_THRESHOLD_LOW_MIN_FOR_DIFF.

When the extracted image feature meets at least one of the following conditions, it may be determined that the image is overexposed:

high_sum_ratio is not less than sumThreshold_high; and
high_diff_hist is not less than DIFFThreshold_high and high_sum_ratio is not less than HDR_SUM_THRESHOLD_HIGH_MIN_FOR_DIFF.

After it is confirmed whether the image is underexposed and overexposed, the determining module 242 further performs determining.

The determining module 242 is configured to determine that the scene of the image is an HDR scene when the extracted image feature meets at least one of the following conditions:

The image is underexposed and high_sum_ratio is not less than HDR_SUM_THRESHOLD_HIGH_MIN (hereinafter referred to as Condition 1).

The image is overexposed and low_sum_ratio is not less than HDR_SUM_THRESHOLD_LOW_MIN (hereinafter referred to as Condition 2).

There is still a difference in an HDR scene between a case in which the image feature meets Condition 1, a case in which the image feature meets Condition 2, and a case in which the image feature meets both Condition 1 and Condition 2. In order to provide more precise data for image synthesis, an HDR scene needs to be further categorized.

Therefore, the determining module 242 is further configured to: when the image feature of the image meets Condition 1 and the image is not overexposed, determine that the scene of the image is a first HDR scene; when the image feature of the image meets Condition 2 and the image is not underexposed, determine that the scene of the image is a second HDR scene; when the image feature of the image meets both Condition 1 and Condition 2 at the same time, determine that the scene of the image is a third HDR scene; and when the image feature of the image meets neither Condition 1 nor Condition 2, determine that the scene of the image is a non-HDR scene.

After determining that the scene of the image is an HDR scene, the second determining unit 240 further determines a type of the HDR scene, which can provide more precise data, for example, the number of frames for exposure and exposure strength, for HDR synthesis performed on an image in the HDR scene, thereby effectively improving quality of the image photographed in the HDR scene.

Specifically, after the determining performed by the determining module 242, when a picture is photographed and synthesized, and when the determining module 242 determines that the image of the scene is the first HDR scene, two frames may be synthesized according to the determined first HDR scene, where one frame is normally exposed, and the other frame is long exposed to synthesize the two frames into the picture. When the determining module 242 determines that the image of the scene is the second HDR scene, two frames are synthesized according to the determined second HDR scene, where one frame is normally exposed, and the other frame is short exposed to synthesize the two frames into the picture. When the determining module 242 determines that the image of the scene is the third HDR scene, three frames are synthesized according to the determined third HDR scene, where one frame is normally exposed, one frame is short exposed, and one frame is long exposed to synthesize the three frames into the picture.

Preferably, in order to reduce time consumed for extracting the image feature, the scene recognition apparatus may further include: an image processing unit 250. The image processing unit 250 is configured to, before the extracting unit 230 extracts the image feature of the image, perform downsampling processing on the image. For example, actual pixels of the image are 1920×1080 pixels, and before the image feature is extracted, the pixels of the image are reduced to 640×360 pixels. In this way, when the image feature is extracted, time consumption can be reduced, thereby speeding up scene recognition.

By using a scene recognition apparatus provided in this embodiment of the present invention, it is first determined, according to sensor data corresponding to an image, whether the image is a non-HDR scene, which can effectively increase a speed of scene determining; when the determining cannot be performed according to the sensor data, an image feature is then used to determine a scene of the image, which can effectively improve accuracy of determining whether the scene of the image is an HDR scene, thereby improving quality of a picture photographed in the HDR scene.

In hardware implementation, the foregoing acquiring unit 210 may specifically be a camera and a sensor. The foregoing units except the acquiring unit 210 may be, in a hardware form, built in or independent of a processor of the terminal, and may also be stored, in a software form, in a memory of the terminal, so that the processor invokes and performs an operation corresponding to each of the foregoing modules. The processor may be a central processing unit (CPU), a microprocessor, a single-chip microcomputer, or the like.

An embodiment of the present invention further provides a terminal, where the terminal includes a scene recognition apparatus provided in this embodiment of the present invention, and the terminal may have a photographing function, for example, a cell phone or a tablet computer.

Figure 3:
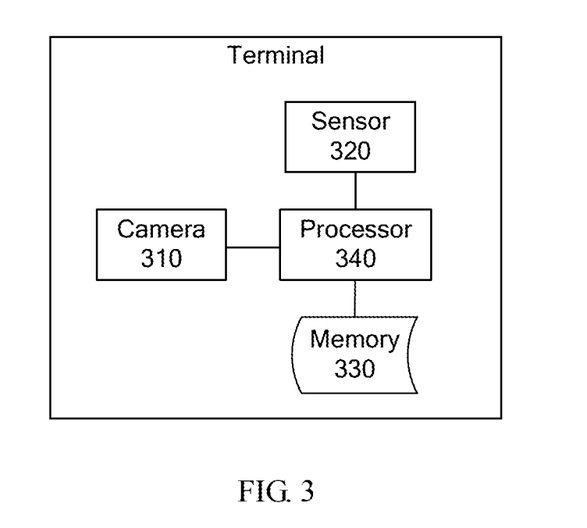
FIG. 3 is a schematic structural diagram of a terminal that has a photographing function according to an additional embodiment of the present invention.

As shown in FIG. 3, FIG. 3 is a schematic structural diagram of a terminal that has a photographing function according to an additional embodiment of the present invention. The terminal includes a camera 310, a sensor 320, a memory 330, and a processor 340 which is separately connected to the camera 310, the sensor 320, and the memory 330. Certainly, the terminal may further include general components, such as an antenna, a baseband processing component, an intermediate radio frequency processing component, and an input and output apparatus, which is not limited by the embodiments of the present invention.

The camera 310 is configured to acquire an image. The sensor 320 is configured to acquire sensor data corresponding to the image that is acquired by the camera 310.

The memory 330 stores a group of program code, and the processor 340 is configured to invoke the program code stored in the memory 330 and is configured to perform the following operations:

acquiring an image and sensor data corresponding to the image;

performing, according to the sensor data, non-high-dynamic range HDR scene determining on a scene of the image;

extracting an image feature of the image when it is not determined, according to the sensor data, whether the scene of the image is a non-HDR scene; and determining, according to the image feature, whether the scene of the image is an HDR scene.

Further, the extracting an image feature of the image is specifically:

extracting, according to image histogram distribution of the image, a dark area pixel ratio, a bright area pixel ratio, intensity of dark area histogram variation, and intensity of bright area histogram variation of the image.

Further, the step of determining, according to the image feature, whether the scene of the image is an HDR scene includes:

determining, according to the image feature, whether the image is underexposed and meanwhile determining whether the image is overexposed; and determining that the scene of the image is an HDR scene when the image is underexposed and the bright area pixel ratio of the image is not less than a preset minimum value of a bright area pixel ratio in an HDR scene, and/or when the image is overexposed and the dark area pixel ratio of the image is not less than a preset minimum value of a dark area pixel ratio in an HDR scene.

Further, the determining, according to the image feature, whether the image is underexposed and whether the image is overexposed is specifically:

determining that the image is underexposed when the dark area pixel ratio is not less than a preset threshold of a dark area pixel ratio;

determining that the image is underexposed when the intensity of dark area histogram variation is not less than a preset threshold of intensity of dark area histogram variation and the dark area pixel ratio is not less than a preset minimum value of a dark area pixel ratio when the intensity of dark area histogram variation reaches the threshold;

determining that the image is overexposed when the bright area pixel ratio is not less than a preset threshold of a bright area pixel ratio; and determining that the image is overexposed when the intensity of bright area histogram variation is not less than a preset threshold of intensity of bright area histogram variation and the bright area pixel ratio is not less than a preset minimum value of a bright area pixel ratio when the intensity of bright area histogram variation reaches the threshold.

Further, the step of determining, according to the image feature, whether the scene of the image is an HDR scene further includes:

determining that the scene of the image is a first HDR scene when the image is underexposed, the bright area pixel ratio of the image is not less than the preset minimum value of a bright area pixel ratio in an HDR scene, and the image is not overexposed;

determining that the scene of the image is a second HDR scene when the image is overexposed, the dark area pixel ratio of the image is not less than the preset minimum value of a dark area pixel ratio in an HDR scene, and the image is not underexposed; and determining that the scene of the image is a third HDR scene when the image is underexposed and the bright area pixel ratio of the image is not less than the preset minimum value of a bright area pixel ratio in an HDR scene, and when the image is overexposed and the dark area pixel ratio of the image is not less than the preset minimum value of a dark area pixel ratio in an HDR scene.

Further, the processor 340 invokes the program code in the memory 330, and is further configured to perform the following operation:

performing downsampling processing on the image.

By using a terminal that has a photographing function provided in an embodiment of the present invention, it is first determined, according to sensor data corresponding to an image, whether the image is a non-HDR scene, which can effectively increase a speed of scene determining; when the determining cannot be performed according to the sensor data, an image feature is then used to determine a scene of the image, which can effectively improve accuracy of determining whether the scene of the image is an HDR scene, thereby improving quality of a picture photographed in the HDR scene.

A person of ordinary skill in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a compact disc ROM (CD-ROM), or any other form of storage medium of known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A scene recognition method comprising:
    acquiring, by a camera, an image;
    acquiring, by a sensor, sensor data corresponding to the image;
    determining, by a processor, in accordance with the sensor data, whether a scene of the image is a non-high-dynamic range (HDR) scene or whether it is undetermined whether the scene of the image is the non-HDR scene;
    extracting an image feature of the image when it is undetermined whether the scene of the image is the non-HDR scene; and
    determining, in accordance with the image feature, whether the scene of the image is an HDR scene.

2. The method of claim 1, wherein extracting the image feature of the image comprises extracting, in accordance with an image histogram distribution of the image, a dark area pixel ratio of the image, a bright area pixel ratio of the image, an intensity of dark area histogram variation of the image, and an intensity of bright area histogram variation of the image.

3. The method of claim 2, wherein determining, in accordance with the image feature, whether the scene of the image is the HDR scene comprises:
   determining, in accordance with the image feature, whether the image is underexposed and whether the image is overexposed; and
   determining that the scene of the image is the HDR scene when the image is underexposed and the bright area pixel ratio of the image is not less than a preset minimum value of a bright area pixel ratio for HDR scenes, or when the image is overexposed and the dark area pixel ratio of the image is not less than a preset minimum value of a dark area pixel ratio for HDR scenes.

4. The method of claim 3, wherein determining, in accordance with the image feature, whether the image is underexposed and whether the image is overexposed comprises:
   determining that the image is underexposed when the dark area pixel ratio is not less than a preset threshold of a dark area pixel ratio;
   determining that the image is underexposed when the intensity of dark area histogram variation is not less than a preset threshold of intensity of dark area histogram variation and the dark area pixel ratio is not less than a preset minimum value of a dark area pixel ratio when the intensity of dark area histogram variation reaches the preset threshold of intensity of dark area histogram variation;
   determining that the image is overexposed when the bright area pixel ratio is not less than a preset threshold of a bright area pixel ratio; and
   determining that the image is overexposed when the intensity of bright area histogram variation is not less than a preset threshold of intensity of bright area histogram variation and the bright area pixel ratio is not less than a preset minimum value of a bright area pixel ratio when the intensity of bright area histogram variation reaches the preset threshold of intensity of bright area histogram variation.

5. The method of claim 4, wherein determining, in accordance with the image feature, whether the scene of the image for HDR scenes further comprises:
   determining that the scene of the image is a first HDR scene when the image is underexposed, the bright area pixel ratio of the image is not less than the preset minimum value of the bright area pixel ratio for HDR scenes, and the image is not overexposed;
   determining that the scene of the image is a second HDR scene when the image is overexposed, the dark area pixel ratio of the image is not less than the preset minimum value of the dark area pixel ratio for HDR scenes, and the image is not underexposed; and
   determining that the scene of the image is a third HDR scene when the image is underexposed and the bright area pixel ratio of the image is not less than the preset minimum value of the bright area pixel ratio for HDR scenes, or when the image is overexposed and the dark area pixel ratio of the image is not less than the preset minimum value of the dark area pixel ratio for HDR scenes.

6. The method of claim 2, further comprising performing downsampling processing on the image before extracting the image feature of the image.

7. The method of claim 3, wherein determining, in accordance with the image feature, whether the scene of the image is the HDR scene further comprises:
   determining that the scene of the image is a first HDR scene when the image is underexposed, the bright area pixel ratio of the image is not less than the preset minimum value of the bright area pixel ratio in for HDR scenes, and the image is not overexposed;
   determining that the scene of the image is a second HDR scene when the image is overexposed, the dark area pixel ratio of the image is not less than the preset minimum value of the dark area pixel ratio for HDR scenes, and the image is not underexposed; and
   determining that the scene of the image is a third HDR scene when the image is underexposed and the bright area pixel ratio of the image is not less than the preset minimum value of the bright area pixel ratio for HDR scenes, or when the image is overexposed and the dark area pixel ratio of the image is not less than the preset minimum value of the dark area pixel ratio for HDR scenes.

8. The method of claim 1, further comprising performing downsampling processing on the image before extracting the image feature of the image.

9. A scene recognition apparatus comprising:
   an acquiring unit comprising a camera and a sensor, wherein the camera is configured to acquire an image, and wherein the sensor is configured to acquire sensor data corresponding to the image; and
   a computing unit comprising a processor, configured to:
      determine, in accordance with the sensor data, whether a scene of the image is a non-high-dynamic range (HDR) scene or whether it is undetermined whether the scene of the image is the non-HDR scene;
      extract an image feature of the image when it is undetermined whether the scene of the image is the non-HDR scene; and
      determine, in accordance with the image feature, whether the scene of the image is the HDR scene.

10. The scene recognition apparatus of claim 9, wherein the computing unit is configured to extract, in accordance with an image histogram distribution of the image, a dark area pixel ratio of the image, a bright area pixel ratio of the image, an intensity of dark area histogram variation of the image, and an intensity of bright area histogram variation of the image.

11. The scene recognition apparatus of claim 10, wherein to determine, in accordance with the image feature, whether the scene of the image is the HDR scene comprises to:
   determine, in accordance with the image feature, whether the image is underexposed and whether the image is overexposed; and
   determine that the scene of the image is the HDR scene when the image is underexposed and the bright area pixel ratio of the image is not less than a preset minimum value of the bright area pixel ratio in an HDR scene, or when the image is overexposed and the dark area pixel ratio of the image is not less than a preset minimum value of the dark area pixel ratio for HDR scenes.

12. The scene recognition apparatus of claim 11, wherein to determine, in accordance with the image feature, whether the image is underexposed and whether the image is overexposed, comprises to:

determine that the image is underexposed when the dark area pixel ratio is not less than a preset threshold of the dark area pixel ratio;

determine that the image is underexposed when the intensity of the dark area histogram variation is not less than a preset threshold of the intensity of dark area histogram variation and the dark area pixel ratio is not less than a preset minimum value of the dark area pixel ratio when the intensity of dark area histogram variation reaches the preset threshold of intensity of dark area histogram variation;

determine that the image is overexposed when the bright area pixel ratio is not less than a preset threshold of the bright area pixel ratio; and determine that the image is overexposed when the intensity of bright area histogram variation is not less than a preset threshold of the intensity of bright area histogram variation and the bright area pixel ratio is not less than a preset minimum value of bright area pixel ratio when the intensity of the bright area histogram variation reaches the preset threshold of the intensity of bright area histogram variation.

13. The scene recognition apparatus of claim 11, wherein the computing unit is further configured to:

determine that the scene of the image is a first HDR scene when the image is underexposed, the bright area pixel ratio of the image is not less than the preset minimum value of the bright area pixel ratio for HDR scenes, and the image is not overexposed;

determine that the scene of the image is a second HDR scene when the image is overexposed, the dark area pixel ratio of the image is not less than the preset minimum value of the dark area pixel ratio for HDR scenes, and the image is not underexposed; and determine that the scene of the image is a third HDR scene when the image is underexposed and the bright area pixel ratio of the image is not less than the preset minimum value of the bright area pixel ratio for HDR scenes, and when the image is overexposed and the dark area pixel ratio of the image is not less than the preset minimum value of the dark area pixel ratio for HDR scenes.

14. The scene recognition apparatus of claim 9, the computing unit is further configured to perform downsampling processing on the image before to extract the image feature of the image.

15. A terminal comprising:
a camera configured to acquire an image;
a sensor configured to acquire sensor data corresponding to the image;
a processor coupled to the camera and the sensor; and
a non-transitory computer readable storage medium storing programming for execution by the processor, the programming including instructions to:
determine, in accordance with the sensor data, whether a scene of the image is a non-high-dynamic range (HDR) scene or whether it is undetermined whether the scene of the image is the non-HDR scene,
extract an image feature of the image when it is undetermined whether the scene of the image is the non-HDR scene, and
determine, in accordance with the image feature, whether the scene of the image is an HDR scene.

16. The terminal of claim 15, wherein the instructions to extract the image feature of the image comprise instructions to extract, in accordance with an image histogram distribution of the image, a dark area pixel ratio of the image, a bright area pixel ratio of the image, intensity of dark area histogram variation of the image, and intensity of bright area histogram variation of the image.

17. The terminal of claim 16, wherein the instructions to determine in accordance with the image feature, whether the scene of the image is the HDR scene comprises instructions to:

determine, in accordance with the image feature, whether the image is underexposed and whether the image is overexposed; and determine that the scene of the image is the HDR scene when the image is underexposed and the bright area pixel ratio of the image is not less than a preset minimum value of the bright area pixel ratio for HDR scenes, or when the image is overexposed and the dark area pixel ratio of the image is not less than a preset minimum value of the dark area pixel ratio for HDR scenes.

18. The terminal of claim 17, wherein the instructions to determine, in accordance with the image feature, whether the image is underexposed and whether the image is overexposed comprises instructions to:

determine that the image is underexposed when the dark area pixel ratio of the image is not less than a preset threshold of the dark area pixel ratio;

determine that the image is underexposed when the intensity of a dark area histogram variation is not less than a preset threshold of intensity of dark area histogram variation and the dark area pixel ratio is not less than a preset minimum value of the dark area pixel ratio when the intensity of dark area histogram variation reaches the preset threshold of intensity of the dark area histogram variation;

determine that the image is overexposed when the bright area pixel ratio is not less than a preset threshold of a bright area pixel ratio; and determine that the image is overexposed when the intensity of bright area histogram variation is not less than a preset threshold of intensity of bright area histogram variation and the bright area pixel ratio is not less than a preset minimum value of bright area pixel ratio when the intensity of bright area histogram variation reaches the preset threshold of bright area pixel ratio.

19. The terminal of claim 17, wherein the instructions to determine, in accordance with the image feature, whether the scene of the image is the HDR scene further comprises instructions to:

determine that the scene of the image is a first HDR scene when the image is underexposed, the bright area pixel ratio of the image is not less than the preset minimum value of a bright area pixel ratio for HDR scenes, and the image is not overexposed;

determine that the scene of the image is a second HDR scene when the image is overexposed, the dark area pixel ratio of the image is not less than the preset minimum value of dark area pixel ratio for HDR scenes, and the image is not underexposed; and determine that the scene of the image is a third HDR scene when the image is underexposed and the bright area pixel ratio of the image is not less than the preset minimum value of a bright area pixel ratio in an HDR scene, and when the image is overexposed and the dark area pixel ratio of the image is not less than the preset minimum value of a dark area pixel ratio for HDR scenes.

20. The terminal of claim 15, wherein the instructions further comprise instructions to perform downsampling processing on the image before extracting the image feature of the image.

* * * * *